US012664151B2

(12) United States Patent 
Shi et al.

(10) Patent No.: US 12,664,151 B2 
(45) Date of Patent: Jun. 23, 2026

(54) DISTRIBUTED TRANSACTION PROCESSING METHOD, SYSTEM, APPARATUS AND READABLE STORAGE MEDIUM

(71) Applicant: EBAOTECH CORPORATION, Shanghai (CN)

(72) Inventors: Yu Shi, Shanghai (CN); Chungang Cai, Shanghai (CN); Jiajie Wang, Shanghai (CN); Xiuqun Wu, Shanghai (CN); Guanggui Wang, Shanghai (CN); Yuanwu Mo, Shanghai (CN)

(73) Assignee: EBAOTECH CORPORATION, Shanghai (CN)

(*) Notice: Subject to any disclaimer, the term of this patent is extended or adjusted under 35 U.S.C. 154(b) by 0 days.

(21) Appl. No.: 18/870,350

(22) PCT Filed: Apr. 27, 2023

(86) PCT No.: PCT/CN2023/091220
§ 371 (c)(1),
(2) Date: Nov. 27, 2024

(87) PCT Pub. No.: WO2023/231665
PCT Pub. Date: Dec. 7, 2023

(65) Prior Publication Data
US 2025/0328521 A1 Oct. 23, 2025

(30) Foreign Application Priority Data

May 31, 2022 (CN) .......................... 202210611120.X

(51) Int. Cl.
| | |
|---|---|
| *G06F 7/00* | (2006.01) |
| *G06F 16/23* | (2019.01) |
| *G06F 16/27* | (2019.01) |

(52) U.S. Cl.
CPC .......... *G06F 16/2379* (2019.01); *G06F 16/27* (2019.01)

(58) Field of Classification Search
CPC ............................ G06F 16/2379; G06F 16/27
USPC ..................................................... 707/600–899
See application file for complete search history.

(56) References Cited

U.S. PATENT DOCUMENTS

2022/0114164 A1* 4/2022 Krishnaswamy ... G06F 16/2308

FOREIGN PATENT DOCUMENTS

CN 104216955 A 12/2014

\* cited by examiner

*Primary Examiner* — Isaac M Woo
(74) *Attorney, Agent, or Firm* — Alleman Hall LLP

(57) ABSTRACT

The present disclosure relates to software technologies, and in particular, to a distributed transaction processing method, system, apparatus and readable storage medium. The method includes a policy data management module creating and initializing a historical version table used to record data content and version information of each version of a target data entity. The initialized version information includes first version information that corresponds to first version data content of the target data entity. The method includes a transaction process processing module sending a received first-type operation request to the policy data management module; and the policy data management module reading the historical version table and recording the second version data content acquired by performing the first-type operation on the first version data content. In this way, distributed transaction processing efficiency and service rollback capability can be improved based on a historical version table, which helps improve user experience.

16 Claims, 4 Drawing Sheets

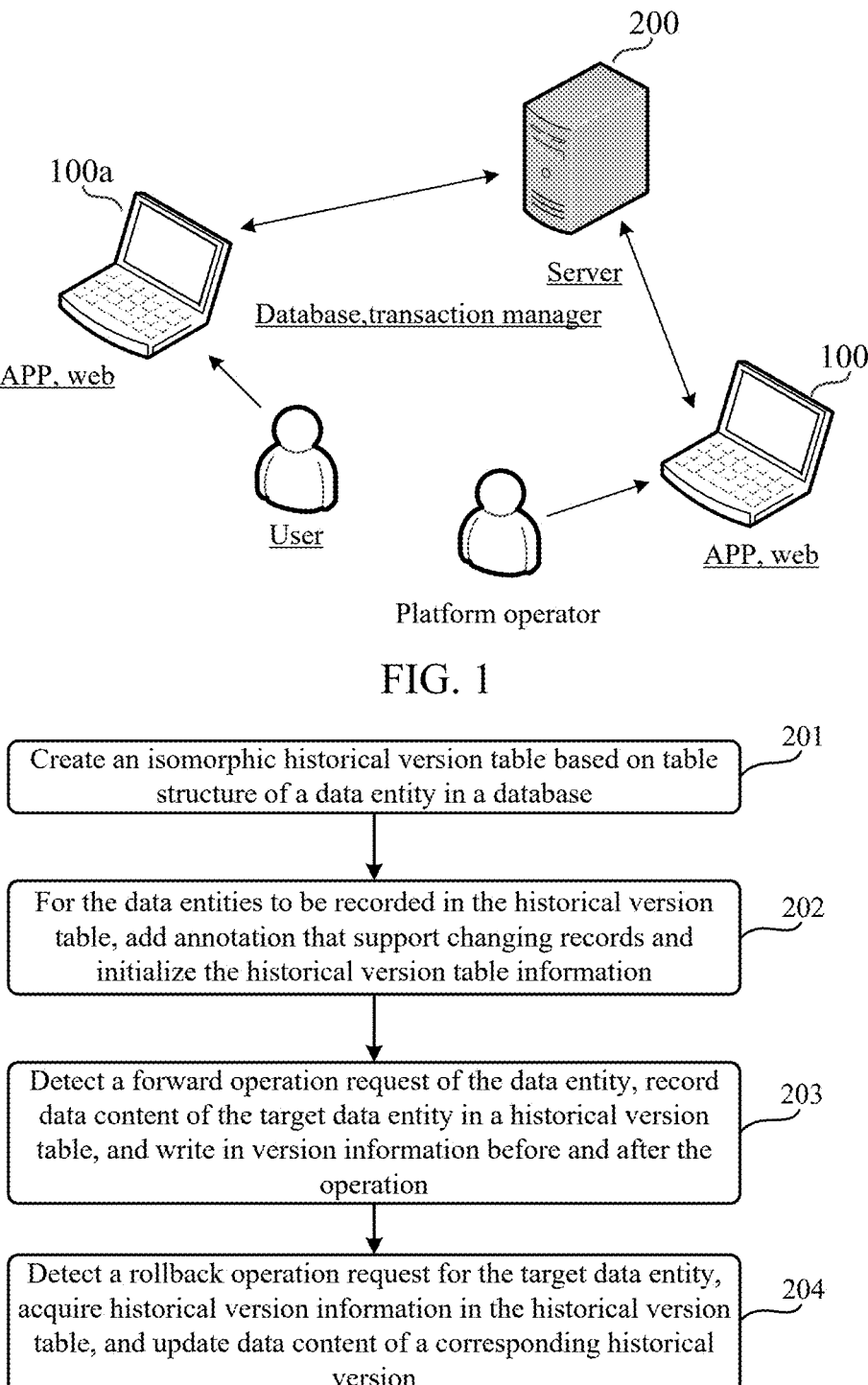

Server

Database,transaction manager

APP, web

100b

User

APP, web

Platform operator

---

Create an isomorphic historical version table based on table structure of a data entity in a database — 201

For the data entities to be recorded in the historical version table, add annotation that support changing records and initialize the historical version table information — 202

Detect a forward operation request of the data entity, record data content of the target data entity in a historical version table, and write in version information before and after the operation — 203

Detect a rollback operation request for the target data entity, acquire historical version information in the historical version table, and update data content of a corresponding historical version — 204

FIG. 2

Policy
| ID | Premium |
|----|---------|
| 100 | 1000 |
| | |
| | |
Address
| ID | Address |
|----|---------|
| 101 | SH |
| 102 | BJ |
| | |
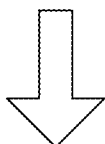
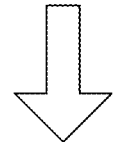
Policy Log
| ID | Start Version | Version Type | Premium |
|----|---------------|--------------|---------|
| 100 | 1 | add | 1000 |
| 100 | 2 | change | 1500 |
| 100 | 3 | change | 1000 |
| 100 | 5 | change | 2000 |
Address Log
| ID | Start Version | Version Type | Address |
|----|---------------|--------------|---------|
| 101 | 1 | add | SH |
| 102 | 4 | add | BJ |
FIG. 3
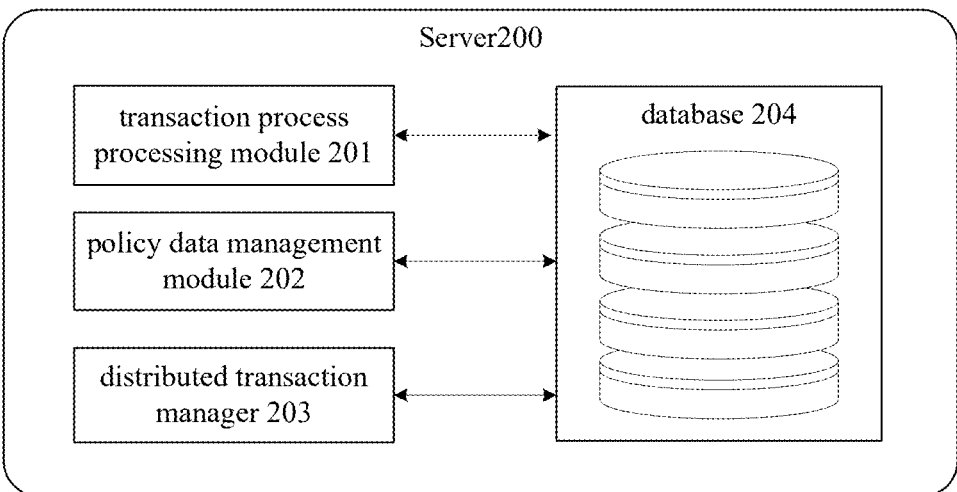
FIG. 4

DISTRIBUTED TRANSACTION PROCESSING METHOD, SYSTEM, APPARATUS AND READABLE STORAGE MEDIUM

CROSS-REFERENCE TO RELATED APPLICATION

The present application is related to, and claims priority to the Chinese Patent Application Serial No. 202210611120.X, entitled "Distributed transaction processing method, system and device, and readable storage medium", filed on May 31, 2022, the entire contents of which are incorporated herein by reference.

TECHNICAL FIELD

The present invention relates to software technology field, and in particular, to a distributed transaction processing method, system, apparatus and readable storage medium.

BACKGROUND ART

A distributed transaction refers to a transaction, whose participant, transaction-supported server, resource server, and transaction manager are respectively located on different nodes of different distributed systems. Wherein, transaction is a program execution unit of a data item in the database.

In a common distributed transaction solution, a Seata based on the XA specification is an open source distributed transaction solution dedicated to providing high-performance and easy-to-use distributed transaction services in a micro-service architecture. The Seata provides users with four transaction processing models: At, TCC (Try-Confirm-Cancel), long transaction model (SAGA) and XA. The At and the XA are models used to process rigid transactions. Because of synchronization blocking and low processing efficiency, rigid transactions are generally not applicable to distributed scenarios of large websites. The TCC and the SAGA are models used to process a flexible transaction, and the flexible transaction allows an intermediate state, and supports transformation of a transaction layer, such as transformation of an application (APP). Therefore, in a distributed scenario of some large websites, the TCC and the SAGA models are widely used. The TCC model can provide three types of transaction interface for main transaction invocation: Try, Confirm and Cancel. Therefore, the TCC divides the transaction running process into Try phase, Confirm phase, and Cancel phase. The Cancel phase can implement transaction rollback for the transaction processed by the Try phase and the Confirm phase. The SAGA implements transaction rollback based on a series of reverse compensation operations. Take insurance transaction as an example, the previously mentioned transaction rollback can be, for example, a changing operation that performed on the created policy, or a cancelling operation that can be performed on the generated policy.

However, in the process of the transaction rollback, currently, a transaction rollback is generally completed by reading a change before and after a data change in a corresponding structured query language (SQL) from a database bottom layer, or based on a rollback code. This embodiment of transaction rollback cannot be applied at a transaction layer (e.g. an application itself). Transaction rollback logic is complex, embodiment is difficult, and development, maintenance, and reconstruction costs related to implementing a corresponding transaction rollback function are relatively high.

SUMMARY OF THE INVENTION

Based on some embodiments, a distributed transaction processing method, system, apparatus and readable storage medium is provided, where the method can record version information and content of a corresponding data entity before and after a data operation such as adding, deleting, or changing. And when it is detected that a rollback operation occurs in a transaction system or an exception occurs in a transaction system as a corresponding data operation is performed on the invoked data entity, the historical version data content of the data entity before the data operation is quickly acquired based on related information such as a version number recorded in the historical version table. The capability of transaction rollback of the distributed system is improved, so that user experience is improved.

As a first aspect, an embodiment provides a distributed transaction processing method, where the method is applied to a distributed transaction processing system including a transaction process processing module, a policy data management module and a distributed transaction manager, and the method comprises:

the policy data management module creating and initializing a historical version table, where the historical version table is used to record data content and version information of each version of the target data entity, an initialized version information includes a first version information, and the first version information corresponds to first version data content of the target data entity;

the transaction process processing module requesting the distributed transaction manager to start the global transaction;

the transaction process processing module receiving a first-type operation request for the target data entity, and sending the first-type operation request to the policy data management module, where the first-type operation request is used to request to perform the first-type operation on the first version data content of the target data entity, and the first-type operation includes at least one of an adding, deleting, and changing operation;

in response to the first-type operation request, the policy data management module reading a historical version table, recording second version data content obtained by performing the first-type operation on the first version data content, and registering a branch transaction with the distributed transaction manager, where the branch transaction is a related transaction that performs the first-type operation; and the distributed transaction manager notifying, based on a first request for submitting the global transaction sent by the transaction process processing module, the policy data management module to submit the branch transaction.

In a distributed transaction processing system, a historical version table can be created by using a policy data management module that manages a data entity related to policy data. So that in the process of creating, a data table structure of a historical version table created is controlled to be the same as a data table structure of a target data entity, that is, isomorphism is implemented. In this way, when detecting that the data table storage content of the target data entity is updated, the system can record the data content before and after the update in a timely manner by using the created historical version table and write in the corresponding version information, so that when another service invokes the historical version table, the system can quickly invoke the data content to the corresponding version based on the version information recorded in the historical version table.

The transaction process processing module in the system can interwork with a distributed transaction system client, and is configured to: Receive a service operation request initiated by a user by operation on the service system client, and then forward the service operation request based on the request content and the request target of the service operation request to a related module in the system for execution. For example, forward the received first-type operation request to a policy data management module for processing. In addition, the program code executed by the transaction process processing module can request to start the global transaction from the distributed transaction manager when determining that the next operation that needs to be performed needs to involve multiple different data sources/or needs to be updated by multiple remote invokes and data update. In this way, system classification processing efficiency for service operation requests is improved. The previously mentioned first-type operation request is an operation request corresponding to a forward operation described in the following embodiments, and the first-type operation is the forward operation. The previously mentioned first-type operation request can be, for example, an operation request that is triggered by an insurance user creates a new insurance policy in an insurance service client operation, and fills in insured/insured personal information, the insurance amount, the address, and the like on the client interface.

When responding to the first-type operation request forwarded by the transaction process processing module, the distributed transaction manager in the system can invoke a historical version table created by the policy data management module. The previously mentioned first version data content can be, for example, initial content of the target data entity. Therefore, the distributed transaction manager can acquire the initial content of the target data entity by using the first version information in the historical version table, and process the first-type operation request based on the acquired initial content. It can be understood that if the policy data management module creates the historical version table of the target data entity, and the record content in the historical version table is updated, when responding to the previously mentioned first-type operation request, the policy data management module can quickly acquire, by using the historical version table, initial content of the target data entity that is used to process the corresponding service operation request, thereby improving service processing efficiency of the distributed transaction manager.

In a possible embodiment of the previously mentioned first aspect, the reading the historical version table In response to the first-type operation request, recording second version data content obtained by performing the first-type operation on the first version data content, comprises:

writing the second version data content into the historical version table, and writing the second version information into the historical version table corresponding to the second version data content; and writing the first version information and the second version information into a log used to cancel rollback.

When processing a request such as adding, deleting, or changing, the policy data management module can read version information by using a log used to cancel the rollback in a distributed transaction, and then read data content of a corresponding version based on a historical version table. The log used to cancel the rollback only needs to store the version number as the index information, and does not need to store the complete changing content. In this way, data operation processing efficiency of the policy data management module can be improved.

In a possible embodiment of the previously mentioned first aspect, the previously mentioned method further comprises:

the transaction process processing module acquiring abnormal data in the global transaction or receiving a second-type operation request for the target data entity, and sending a second request for rollback of the global transaction to a distributed transaction manager, where the second request is used to request to rollback the global transaction, so as to update the data content of the target data entity from the second version data content back to the first version data content;

the distributed transaction manager notifying the policy data management module to rollback the branch transaction based on the second request; and based on the notification of rollback of the branch transaction, the policy data management module acquiring the first version data content based on the first version information recorded in the historical version table, and recovering to the current data content of the target data entity.

The previously mentioned second-type operation can be, for example, a rollback operation request initiated by a distributed transaction system client. And the abnormal data in a global transaction that is acquired by the transaction process processing module can be, for example, abnormal data that is reported by a service system when a corresponding data operation on the invoked data entity is abnormal, for example, a database write failure or a network exception occurs and so on. When receiving the rollback operation request or acquiring the abnormal data in the global transaction, the transaction process processing module can send a second request for rollback of the global transaction, that is, a request for rollback of the global transaction, to the distributed transaction manager. The distributed transaction manager can, in response to the request, notify the policy data management module to rollback the branch transaction. Further, the policy data management module can read the updated historical version table, and quickly acquire the historical version data content before the data entity performs the data operation to implement rollback. In this way, response processing efficiency of the distributed transaction system to the rollback transaction can be improved, and a rollback capability of the system can be improved. It can be understood that version information recorded in the historical version table and content of the target data entity are updated when the distributed transaction manager processes the first-type operation request in the previously mentioned step.

In a possible embodiment of the previously mentioned first aspect, the log used to cancel rollback includes a rollback log, and the acquiring the first version data content based on the first version information recorded in the historical version table comprises:

acquiring the first version information recorded in the rollback log;

acquiring the first version data content based on a correspondence between the first version information in the historical version table and the first version data content.

When processing a rollback operation request or an abnormal rollback transaction, the policy data management module can read version information by using a rollback log (undo log), and then read data content of a corresponding version based on a historical version table. In the undo log, only a version number needs to be stored as index information, and complete change content does not need to be stored. In this way, data operation processing efficiency of the policy data management module can be improved.

In a possible embodiment of the previously mentioned first aspect, the historical version table is created by:

creating the historical version table whose structure is the same as a first data table structure based on the first data table structure corresponding to the target data entity.

That is, a historical version table created by the policy data management module is isomorphic to a data table structure of the target data entity. The previously mentioned first data table structure is a structure of any data table or a type of data table corresponding to the target data entity.

In a possible embodiment of the previously mentioned first aspect, a parameter list of the historical version table includes a primary key, a type, a start version, and a to-be-recorded transaction field, and the version information includes a version number recorded in a start version field of the historical version table.

The previously mentioned primary key and the to-be-recorded transaction field are corresponding to data content recorded in the historical version table, where the primary key can be, for example, an ID of policy data, and the to-be-recorded transaction field can be, for example, a field such as a premium or an address. For example, a type in the previously mentioned historical version table can record an operation type corresponding to the previously mentioned first-type operation, for example, adding, deleting, or changing. A start version in the previously mentioned historical version table is, for example, an identification symbol written based on a preset version number setting rule corresponding to the recorded data version information. It can be understood that, when data content is updated each time, a start version number recorded in the historical version table is in a one-to-one correspondence with data content before and after the update. That is, in the historical version table, data content of each version is corresponding to a start version number. The start version number can be used as identification information for acquiring data content of a corresponding version when the policy data management module responds to a first-type operation request to perform a first-type operation or a during a rollback of branch transaction based on a notification of the branch transaction rollback of a distributed transaction manager, so as to quickly acquire data content.

It can be understood that, data content of a corresponding version is acquired by using version information such as a start version number recorded in a historical version table, which can replace a complex invoking process implemented in which distributed transaction processing invokes a target data entity from a database, a changing log of the target data entity, and the like. Therefore, efficiency of acquiring the corresponding data content can be improved, and processing efficiency of a distributed transaction can be improved.

In a possible embodiment of the previously mentioned first aspect, each parameter in the parameter list of the historical version table is associated with each parameter in the first data table structure, and the association is created by:

the policy data management module adding first annotation information to the first data table structure by using a preset annotation tool, where the first annotation information is parsed by a storage management engine, and is used to update each parameter in the historical version table based on a change of each parameter in the first data table structure.

In a possible embodiment of the previously mentioned first aspect, the preset annotation tool is an @Audit provided by the Hibernate Envers, and the storage management engine is a Hibernate.

It can be understood that the policy data management module has an advantage of invoking content and structure of the managed target data entity. Therefore, after creating the historical version table, the policy data management module can add a note to the Java class of the data table structure of the target data entity by using a @Audit Java class annotation provided by the Hibernate Envers. In this way, after the engine Hibernate that is responsible for storing the database parses to find out that the code has this annotation, data content and version information before and after the corresponding data table content of the data entity can be updated and recorded in the historical version table. In this way of updating and changing a data entity recorded by using a historical version table, logic is simple, operation is convenient, a degree of impact on an original database and a distributed transaction processing process is relatively small, and distributed transaction processing efficiency can be further improved.

In a possible embodiment of the previously mentioned first aspect, the first version information is a first version number recorded in a start version field in the historical version table.

That is, the first version information is a start version number that is recorded in the historical version table and that is corresponding to first version data content.

In a possible embodiment of the previously mentioned first aspect, in response to the first-type operation request, the policy data management module reading a historical version table, comprises:

a preset SQL, where the preset SQL at least includes one of: a name of the historical version table, a primary key, and a version number recorded in a start version field in correspondence.

When responding to the first-type operation request, the policy data management module can complete, by using a simple SQL statement, the response of historical version table and the query and acquiring of data content of a corresponding version. A query process execution statement is simple and efficient, and efficiency of acquiring the corresponding data content can also be improved.

In a possible embodiment of the previously mentioned first aspect, the first-type operation request is a distributed transaction operation request written into a bin log event or an update log event of MySQL; and the transaction process processing module receiving a first-type operation request for the target data entity, and sending the first-type operation request to the policy data management module, comprises:

the transaction process processing module determining that the first-type operation request is a distributed transaction operation request written into a bin log event or an update log event of MySQL;

the transaction process processing module parsing the received bin log event to acquire bin log data, or parsing the received update log event to acquire update log data;

the transaction process processing module identifying a distributed transaction operation request corresponding to an adding operation, a deleting operation, or a changing operation based on the bin log data or the update log data; and the transaction process processing module forwarding the identified distributed transaction operation request as the first-type operation request to the policy data management module.

It can be understood that a type of the distributed transaction operation request is identified by parsing the bin log event or the update log event of the MySQL, and a data change recorded at the bottom of the database can be acquired into a Java program executed at an application layer. The data acquiring method is simple, direct, and timely. In addition, this method of acquiring operation request data can further avoid code changing on a server that supports the distributed transaction system, thereby reducing development workload corresponding to server or system changing.

In a possible embodiment of the previously mentioned first aspect, the second-type operation request is a distributed transaction operation request written into a bin log event of the MySQL; and the transaction process processing module receiving a second-type operation request for the target data entity, and sending a second request for rollback of the global transaction to a distributed transaction manager, comprises:

the transaction process processing module parsing the received bin log event to acquire the bin log data;

the transaction process processing module identifying, based on the bin log data, a rollback operation request for requesting to update second version data content back to the first version data content; and the transaction process processing module sending a second request for rollback of the global transaction to the distributed transaction manager based on the identified rollback operation request.

The bin log event of the MySQL is parsed to identify a rollback operation request or abnormal running data of a distributed transaction, so as to determine whether rollback processing needs to be performed on data content of a target data entity in a database, and data changes or abnormal data recorded at a database bottom layer can be acquired into a Java program executed at an application layer. A data acquisition process is simple, direct, and timely, and development workload corresponding to server or system reconstruction is reduced.

In a possible embodiment of the previously mentioned first aspect, the second-type operation request comprises:

a request for cancelling the first-type operation, or a request for invoking the first version data content to perform the first-type operation again.

The previously mentioned request for cancelling the first-type operation is, for example, a distributed transaction rollback request initiated by the user by performing a rollback operation by using the client of the distributed transaction system, for example, a policy information page filled in before the operation is returned when the user pays the insurance amount to re-confirm the rollback operation request initiated by the client. In other embodiments, the previously mentioned request for cancelling the first-type operation can also be a recovery request initiated when the transaction system client is abnormal, so as to request to recover to initial data content. No limitation is imposed here.

It can be understood that when another user needs to invoke, by using another client, the first version data content of the data entity to perform a corresponding transaction operation, the policy data management module can also quickly acquire the first version data content by using the information about the first version recorded in the historical version table for processing.

In a possible embodiment of the previously mentioned first aspect, the target data entity is stored in a database for distributed transactions, and the method comprises:

in the process of executing the first-type operation, data content of the target data entity stored in the database is consistent with real-time data content of the target data entity operated by the policy data management module by:

the distributed transaction manager acquiring an active transaction list at a current moment, where the active transaction list is used to mark execution progress of the first-type operation performed by each data entity in the database, and each data entity in the database includes the target data entity; and the distributed transaction manager forming a consistency compensation statement and a compensation instruction based on the active transaction list and the log data corresponding to the target data entity generated by the current database, and sending the consistency compensation statement and the compensation instruction to the database, where the compensation instruction is used to instruct the database to execute the consistency compensation statement, and update the real-time data content corresponding to the execution progress of the first-type operation to the data content of the target data entity in the database.

When exporting the target data entity from the database to perform operations such as adding, deleting, and changing, the distributed transaction manager can form a data consistency compensation statement based on the active transaction list and a log that is recorded in the database and corresponding to the target data entity, and instruct a corresponding database to execute the statement to update data content of the target data entity in the database. In this way, it can be ensured that in a distributed transaction processing process, data content stored in the database is timely consistent with data content that is operated, so that when corresponding data content in the database is invoked by another distributed system, real-time updated data content is exported. Data content before a corresponding operation can be recorded in a historical version table. When rollback needs to be performed in a subsequent distributed transaction operation process, corresponding data content can be acquired based on corresponding version information for processing, and the history data content does not need to be acquired from a corresponding log recorded in a database. Based on this, efficiency of distributed transaction processing and timeliness of updating database data content can be effectively improved.

As a second aspect, an embodiment provides a distributed transaction processing system, the distributed transaction processing system comprises a transaction process processing module, a policy data management module, and a distributed transaction manager, wherein the policy data management module is configured to create and initialize a historical version table, where the historical version table is used to record data content and version information of each version of a target data entity, the initialized version information includes first version information, and the first version information is corresponding to first version data content of the target data entity; and in response to the first-type operation request, read a historical version table, record second version data content acquired by performing the first-type operation on the first version data content, and register a branch transaction with a distributed transaction manager, where the branch transaction is a related transaction that performs the first-type operation;

the transaction process processing module is configured to: receive a first-type operation request for the target data entity, and send the first-type operation request to a policy data management module, where the first-type operation request is used to request to perform a first-type operation on the first version data content of the target data entity, and the first-type operation includes at least one of an adding, deleting, and changing operation; and acquire abnormal data in the global transaction, or receive a second-type operation request for the target data entity, and send a second request for rollback of the global transaction to the distributed transaction manager, where the second request is used to request to rollback the global transaction, so as to update data content of the target data entity from the second version data content back to the first version data content; and the distributed transaction manager is configured to: receive a notification sent by a transaction process processing module to start a global transaction, receive a request for registering the branch transaction by a policy data management module, and store registration information of the branch transaction; and notify the policy data management module to submit the branch transaction based on the notification for submitting the global transaction sent by the transaction process processing module.

As a third aspect, an embodiment provides an apparatus, including: one or more processors; one or more memories; the one or more memories store one or more programs. When one or more programs are executed by the one or more processors, the apparatus performs the distributed transaction processing method provided in the first aspect.

As a fourth aspect, an embodiment provides a computer readable storage medium, where the computer readable storage medium stores instruction, and when the instruction is executed on a computer, the computer executes the distributed transaction processing method provided in the first aspect.

BRIEF DESCRIPTION OF THE DRAWINGS

FIG. 1 is a schematic diagram of an application scenario of a distributed transaction system based on an embodiment.

FIG. 2 is a schematic flowchart of a distributed transaction processing method of an embodiment.

FIG. 3 is a schematic diagram of adding a historical version to a part of a data entity in a policy database based on an embodiment.

FIG. 4 is a schematic block diagram of a software structure of a server 200 based on an embodiment.

10

Figure 6:
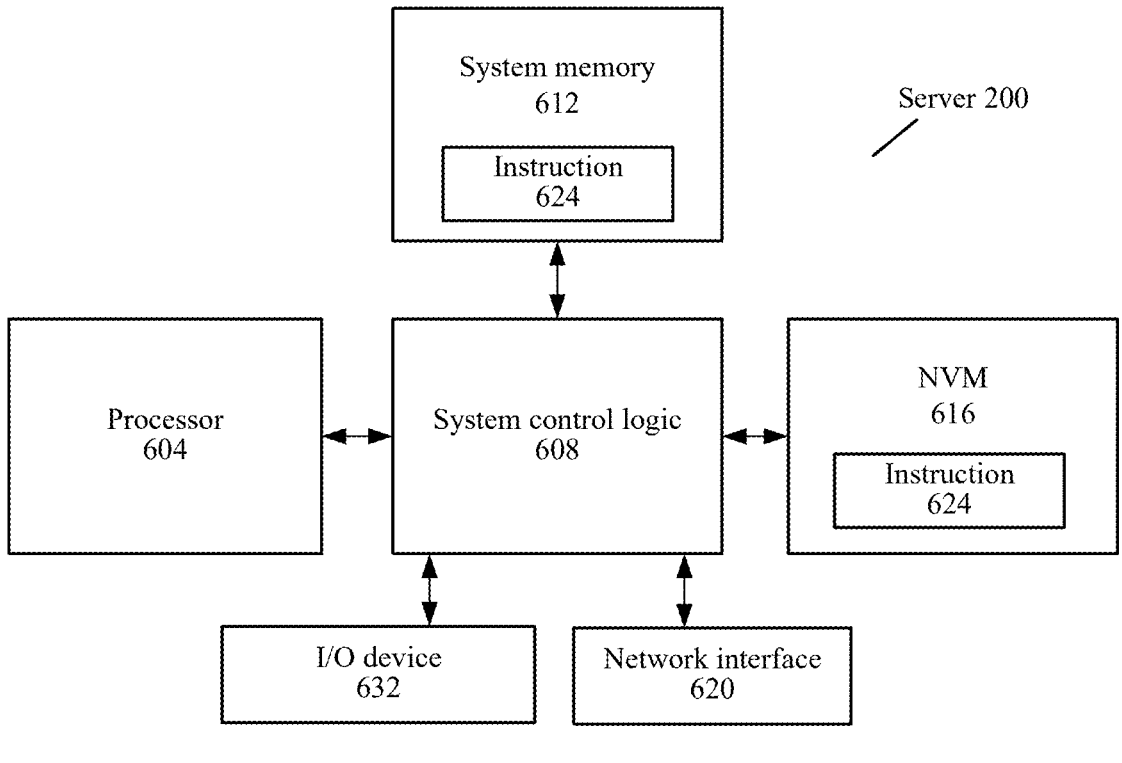

FIG. 6 is a schematic hardware structural diagram of a server 200 based on an embodiment.

DETAILED DESCRIPTION OF THE EMBODIMENTS

To facilitate understanding of the solutions, below is explanation of some concepts in the technical fields involved in the embodiments.

(1) Database is used to store a large number of data entities. The database design is a process of planning and structuring the relationship between the data entities in the database and these data entities.

(2) The data entity, as far as the database is concerned, usually refers to an individual data set corresponding to a type of data object. Each data entity can record, by using a data table structure, individual data corresponding to a data object and an association relationship between individual data. Therefore, a data table structure of each data entity can include one or more data tables that are associated with each other, and a primary key of each data table is associated with each other. For example, a primary key of one data table can be a foreign key of another data table.

(3) The data table is composed of the table name, field in the table and record in the table. A design data table structure (hereinafter referred to as a table structure for short) defines a data table file name, determines fields included in the data table, field names, field types, and widths of each field, and inputs the data into a computer.

(4) A primary key is a combination of one or more columns in a table, and a value of the primary key can uniquely identify each row in the table. A primary key of a data table can be associated with a foreign key of another table, so as to associate addition, deletion, change/changing of a field text or the like in the another data table.

(5) The ACID feature refers to four required features in a process in which a database systems (DBMS) writes or updates data to ensure that a transaction is correct and reliable: atomicity (or referred to as indivisibility), consistency, isolation and durability.

FIG. 1 is a schematic diagram of an application scenario of a distributed transaction system based on an embodiment.

As shown in FIG. 1, this scenario includes interaction between the terminal device 100a and 100b and the server 200. The server 200 can include multiple databases, a transaction manager to process a distributed transaction, and the like, so as to provide a distributed data transaction for each terminal device.

A user or a platform operator of a corresponding transaction system can run a transaction system application program or a web-based transaction system application by using the terminal device 100a. As an example, the transaction system can be, for example, an insurance transaction system. A user who wants to insure can log in to the system account on an insurance transaction system running on the terminal device 100a, select an insurance entry, fill in personal information, generate a policy, pay a premium, and the like. In a process in which the user performs a series of operations on the terminal device 100a, corresponding operation data is accessed to a corresponding database of the server 200. If the user needs to make change to a completed operation, such as changing personal information in a policy, or the user wants to return to the previous page of the current page to perform an operation on the terminal device 100a, in this case, the transaction system running on the terminal device 100a performs a corresponding transaction rollback, and supports a rollback or changing operation of the user.

Similarly, another user or a platform operator of a corresponding transaction system can also enter the transaction system by using another terminal device 100b. For example, the platform operator can log in to the insurance transaction system by using the terminal device 100b, and view or approve the policy content. In this case, the terminal device 100b can acquire corresponding policy data from the policy database on the server 200, and display the policy data on the screen of the terminal device 100b. In addition, the platform operator can also perform a changing or cancelling operation on the generated policy at the request of the user. In this case, the transaction system running on the terminal device 100b also needs to have a transaction cancel function, so as to support the changing or cancelling operation of the platform operator.

In a current distributed transaction solution, whether a transaction rollback capability is implemented by reading a change before and after a data change in a corresponding SQL statement to a database bottom layer or a transaction rollback capability based on a rollback code, the embodiment logic is relatively complex, and the distributed transaction system needs to be greatly changed, and corresponding development and maintenance costs are relatively high.

To resolve the previously mentioned technical problem, some embodiments provides a distributed transaction processing method. Specifically, in the method, a historical version table whose structure is the same as the structure of a data table of a target data entity is added to a database, so as to record version information and content of the target data entity before and after a data operation such as adding, deleting, or changing (or being changed). For example, in the historical version table, fields such as a version number or a version type can be added to a basic data table structure corresponding to the target data entity, so as to implement isomorphism with a data table structure of the target data entity, which is not limited herein.

In this way, in the previously mentioned scenario in which the server interacts with the terminal device shown in FIG. 1, when the server 200 detects that a rollback operation is performed on a transaction system running on the terminal device 100a or the terminal device 100b, or an exception occurs on the transaction system in performing a corresponding data operation on the invoked data entity, the server 200 can quickly acquire, based on related information such as a version number recorded in the historical version table, data content of a historical version before the data entity is executed to implement rollback. In addition, based on the historical version table, the server 200 can further quickly restore the operated data version when the user performs a forward operation on the transaction system running on the terminal device 100a or the terminal device 100b. That is, in this application solution, a fast rollback operation of a distributed transaction on a distributed transaction system can be supported, and when a forward operation is performed on a corresponding transaction system of a user, recorded historical operation data can be quickly recovered.

It can be understood that, based on the distributed transaction processing method provided in this application, an isomorphic historical version table is added to a data table structure of a target data entity in a database of a server, so that data entity version information, data content, and the like before and after a corresponding data operation being performed on an application layer can be recorded. The application layer can be, for example, a Java program layer that operates in the server 200 and that communicates with a terminal device, which is not limited herein. Therefore, the server 200 can make use of the historical version table which has the records of data entity version information, data content, and the like before and after a corresponding operation being performed, for data rollback ability of a distributed transaction.

In addition, the previously mentioned historical version table can be adaptively designed for each distributed transaction system interconnected at the application layer. For example, the data table structure corresponding to a data entity of a corresponding distributed transaction system is isomorphic designed, so that information in the table is conveniently read during subsequent invoking. In addition, an embodiment process of the distributed transaction processing method provided in this embodiment is independent of the type of a database at a bottom of a system of the server 200, and can support various types of databases. Therefore, scenario adaptability of the method is good, and no additional performance loss is caused to the server.

It can be understood that the distributed transaction processing method provided in this embodiment is not limited to the previously mentioned server 200, a mobile phone, a tablet computer, a desktop, a laptop, a handheld computer, a netbook, and an augmented reality (AR)/virtual reality (VR) device, a wearable device such as a smart watch, a mobile e-mail device, a mobile vehicle computer device, a portable game console, a portable music player, a reader device, a television set embedded or coupled with one or more processors, or another device that can access a network.

The following describes in detail a specific embodiment process of the distributed transaction processing solution provided in the embodiments by using the server 200 in the scenario shown in FIG. 1 as an example.

Based on the previously mentioned scenario shown in FIG. 1, FIG. 2 shows a schematic flowchart of a distributed transaction processing method of an embodiment. It can be understood that the steps shown in FIG. 2 can be executed by the server 200 in the scenario shown in FIG. 1. Specifically, the embodiment procedure can include the following steps:

201: Create an isomorphic historical version table based on table structure of a data entity in a database.

For example, when a database required by a distributed transaction system is created in the server 100, a set of historical version tables can be added to a database structure in a database design phase. The table structure of the added historical version table can be the same as the table structure of the target data entity in the database, that is, the previously mentioned "isomorphism". Similarly, for a database that has been created on the server 200, a database interface can also be invoked to add an isomorphic historical version table to each data entity in the database, and then initialize the original version in the corresponding database through data migration. It can be understood that a data item recorded in the historical version table can include a primary key of the target data entity table, version information before and after changing, and content before and after changing. Based on content before and after changing, an operation type (adding, deleting, or changing) can be identified.

The exemplary form of the historical version table can be referred to as shown in Table 1 below:

TABLE 1

| Primary Key | Field 1 | Start Version | End Version | Field 2 | . . . |
|---|---|---|---|---|---|
| 101 | Zhang San | 1 | 2 | ABC | . . . |
| 101 | Zhang San | 2 | NULL | ABC-2 | . . . |

13

TABLE 1-continued

| Primary Key | Field 1 | Start Version | End Version | Field 2 | . . . |
|---|---|---|---|---|---|
| 201 | Li Si | 5 | 7 | DEF | . . . |
| 201 | Li Si | 7 | NULL | DEF | . . . |

As shown in Table 1, the "Primary Key" in the historical version table can be a primary key of each data table corresponding to a data entity, for example, can be an identification string such as an ID. "Field 1" and "Field 2" in the historical version table can be transaction fields recorded in each data table of a corresponding data entity. For example, "Field 1" can record a name, an address, a premium, and the like. "Field 2" can record a version type, a changing type, and the like. The "Start Version" in the historical version table can be a version number corresponding to data content before a data operation of the target data entity, and the "End Version" can be a version number of data content generated after the data operation, for example, refer to the first line shown in Table 1, a start version "1" is a data content version number before a data operation, and an end version "2" is a data content version number generated after a data operation. After a data operation, a primary key, a field 1, a start version, an end version, and a field 2 that are corresponding to the data entity after the operation can be recorded in another line of the historical version table, for example, refer to the second line shown in the previously mentioned Table 1. In this case, a start version of the second line record is "2".

It can be understood that if the target data entity does not perform any data operation, the version number of the "End Version" in the historical version table shown in the previously mentioned Table 1 can be null values, for example, "NULL" shown in the previously mentioned Table 1.

Take a database corresponding to an insurance transaction as an example. FIG. 3 shows a schematic diagram of adding a historical version to a part of data entity in a policy database based on an embodiment.

As shown in FIG. 3, for an original table structure of some data entities in a corresponding database, refer to, for example, a "Policy" table and a "Address" table. Referring to FIG. 3, the primary key in the "Policy" table is an ID, and the field recorded is a specific amount of a "Premium". For example, data corresponding to a start version whose ID is 100 is "1" is 1000. The primary key of the Address table is also an ID, and a recorded field is specific content of "Address". For example, "Address" data whose ID is 101 is "SH", and "Address" data whose ID is 102 is "BJ".

As shown in FIG. 3, based on the previously mentioned table structure of the data entity, for a created isomorphic historical version table, refer to the "Policy Log" table and the "Address Log" table shown in FIG. 3. Compared with the previously mentioned "Policy" table, the "Policy Log" table adds a version number field (refer to "Start Version" shown in FIG. 3) and a "Version Type" field. It can be understood that the "Type" field in the "Policy Log" table is, for example, the "Field 1". And "Version Type" field in the previously mentioned Table 1 is, for example, the "Field 2" in the previously mentioned Table 1, which is not limited herein. Similarly, the "Address Log" table adds the "Start version" field and the "Version Type" field comparing to the "Address" table.

It can be understood that isomorphic historical version table can completely store a change history of data, and can be read and written by using SQL when a recorded historical version is invoked subsequently. The specific role of the version number field added in the previously mentioned historical version table in performing a subsequent rollback transaction process initiated by a rollback operation or the like is described in the following step 203, and details are not described herein again.

202: For the data entities to be recorded in the historical version table, add annotation that support changing records and initialize the historical version table information.

For example, the server 200 adds a note to a data entity that needs to be recorded in a historical version table, so as to support a record changing process of content of a target data entity, that is, support changing records. As an example, an annotation can be added to the data structure Java class of the target data entity, for example, by using "@Audit" provided by the Hibernate Envers tool. Then, after the engine (Hibernate) responsible for database storage acquires that the code has this annotation by parsing, a change history can be recorded in a historical version table when a data table of a target data entity is updated. For an example, process of adding a note to the Java class of the target data entity by using the @Audit, refer to the following steps:

```
"@Entity
@Audited
public class Book
@javax.persistence.Id
@GeneratedValue(strategy = GenerationType.AUTO)
private Long id;
private String title;
private String author;
private String description;
private long price;
private boolean valid;
// getter and setter
}"
```

It can be understood that the historical version data recorded by using the @Audit annotation is isomorphic to the data table of the data entity, for example, the historical version table "Policy Log" shown in FIG. 3 is isomorphic to the data table "Policy" shown in FIG. 3. Therefore, the parameter list noted by using the @Audit annotation can include "ID", "Operation Type", and some transaction fields, such as "Premium". In addition to ID and Type, there can be other transaction fields, but does not include program parameters during invoking and user information. After an annotation is completed, the server 200 can initialize data content of the target data entity in the created historical version table, and record a corresponding start version number.

It can be understood that Hibernate Envers is typically a framework for auditing entities, and @Audit is one of the annotation components used in the Hibernate Envers tool and is a Java annotation. @Audit is typically used for annotation on Java classes that invoke entities or attributes, to support data changing records. In this embodiment, the Hibernate Envers tool can be configured to assist in recording version number information of each data entity in the database, and store a data change caused by a data operation in a corresponding set of isomorphic historical version tables.

In other embodiments, other tools can be used to add annotation of "supports changing records" to the data entity, which is not limited herein.

203: Detect a forward operation request of the data entity, record data content of the target data entity in a historical version table, and write in version information before and after the operation.

For example, the server 200 can receive an operation request corresponding to a data entity invocation initiated by a transaction system running on the terminal device and an operation such as adding, deleting, or changing and the like performed on the invoked data entity, which is the previously mentioned forward operation request, and the server 200 can respond to the forward operation request, and record, based on the operation content, data content, version information, and the like that are before and after the operation on the target data entity in the database.

In some embodiments, the forward operation request can be, for example, a distributed transaction operation request written to a binary log (bin log) event or an update log (update log) event of a relational database management system (MySQL). The bin log can store all actions of changing table data in the database, and include all statements of all updated data or potential to-be-updated data. In some embodiments, the bin log type can be started using the −log-bin[=file_name] option, and MySQL writes in the log file of the SQL command containing all updated data.

The update log can provide query information, but only provides query for changing database content. In some embodiments, the −log-update server option can be used to enable the update log. When this log type is enabled, MySQL will create a file named HOSTNAME.nnn under the data directory. Based on the bin log data acquired by parsing the bin log event, a specific type of the received operation request can be analyzed, for example, whether it is an operation such as adding, deleting, or changing initial data content of the target data entity.

Take a TCC model for processing distributed transactions as an example, a transaction system invokes a forward operation performed by a data entity, including adding, deleting, or changing operations involved in two phases of an initial operation (Try) and an acknowledgment operation (Confirm) in a TCC mode. The SAGA model for processing distributed transactions is used as an example. A forward operation performed by the transaction system by invoking the data entity is an operation such as adding, deleting, or changing in this mode. No limitation is imposed here.

As an example, as shown in FIG. 3, the "Policy Log" table records the "Premium" field of the ID (the primary key) =100. A version number of the "start version" field in the first line of the record is "1", and a corresponding amount of the "Premium" field in the "Policy Log" table whose "Start version" is "1" is "1000".

If a detected forward operation is to add data to a data entity whose "Start Version" is "1" in the "Policy Log" table=100 (that is, ID=100), referring to FIG. 3, a type of "add" is recorded in a "Version Type" field recorded in a first row of the historical version table "Policy Log", and related information about the data is added to the second row of the record, including writing the "Start Version" field in the second row of the record to the "2", where the "Premium" is "1500". In other embodiments, the historical version table created based on this application can further include an "End Version" field. When the version number in the "Start Version" field is updated, the end version number can also be recorded, so as to indicate a data content basis changed by the data entity, which is not limited herein.

Similarly, after the previously mentioned data adding operation is performed, if another type of data operation is further performed, for example, the data changing operation is continued, refer to the "Policy Log" table shown in FIG. 3. In this case, data whose "Start Version" is "1" is invoked as start data to be recorded in a third line of the "Policy Log" table, a "Version Type" field in a third line record is written into a type of "change", a "Start version" field is written into "3", and a "Premium" is updated to "1000".

When the data changing operation is complete, the information related to the changed data entity is written in the fourth line record of the "Policy Log" table, including "Change" type under the "Version Type" field of the fourth line record, and "5" under the "Start Version" field, and the changed "Premium" is "2000".

204. Detect a rollback operation request for the target data entity, acquire historical version information in the historical version table, and update data content of a corresponding historical version.

For example, the server 200 can receive an operation request that is sent by the terminal device and for performing rollback on data content of a certain or some data entities, and in response to the request to query a corresponding historical version table by using a preset query statement, acquire version number information of a target data entity recorded in the historical version table, for example, acquire a version number of a "Start Version" recorded in the corresponding historical version table. Further, the server 200 can update the data content of the corresponding version to the target data entity based on the acquired version number information, for example, restore the data content of the start version "1" to the target data entity, and further, the transaction system can display a corresponding page after transaction rollback. For example, the updated start version data content can be displayed on the page, which is not limited herein. The transaction system can generate, for example, the previously mentioned rollback operation request sent to the server 200 based on the rollback operation performed by the user on the transaction system interface. In other embodiments, the server 200 can rollback the global transaction when detecting the abnormal data reported by the global transaction. As an example, if the server 200 is to query the primary key=100, for example, data whose historical version is 1 can be queried by using the following SQL:

Select * from XXX_LOG where "Primary Key"=100
        "Start Version"<=1

Wherein, "XXX_LOG" is a name of a historical version table of the target data entity, for example, can be a "Policy Log" table or an "Address Log" table shown in FIG. 3. "Primary Key" can be, for example, an ID in the "Policy Log" table or the "Address Log" table shown in FIG. 3. Therefore, the SQL in the previously mentioned example can be queried by using the "Primary Key"=100 to acquire the "Policy Log" table shown in FIG. 3, so as to acquire the "Premium" field data whose start version number is "1" in "Policy Log", that is, "1000".

Based on the SQL query in the previously mentioned example, the start version number "1" can be used to quickly update the "Premium" data on the transaction system interface to the "1000" corresponding to the start version number "1" in "Policy Log".

Similarly, in a distributed system of an insurance transaction, if a user changes, in an operation on a transaction system interface, "Address" information, "Insured" information, "Policy Holder" information, and the like in a generated policy, the transaction system generates a corresponding rollback operation request based on an operation of the user, and sends the corresponding rollback operation request to the server 200, the server 200 can perform step 204 to quickly acquire start version data entity corresponding to rollback operation based on information such as version number recorded in the historical version table corresponding to the target data entity, to respond to the rollback operation request of the transaction system.

It can be understood that, based on the previously mentioned distributed transaction processing method shown in FIG. 2, the content and change of a data entity before and after an operation, are recorded by using an isomorphic historical version table created by a corresponding data entity. In a program module that is on the server 200 and that is configured to support a transaction system rollback function of the terminal device, only a small quantity of code needs to be added to a data access layer, for example, SQL-related code that invokes a historical version table, so as to implement a rollback capability of the distributed transaction system, or a data compensation capability corresponding to an operation such as changing or cancelling. In addition, the distributed transaction processing method provided in this embodiment is an improvement implemented in the server 200 connected to each terminal device. Therefore, the method can be applicable to rollback operations of distributed transaction systems of various complexity degrees, that is, for all distributed transaction systems, a same set of data rollback logic corresponding to a process shown in FIG. 2 can be used. Therefore, workload of development and maintenance of a related transaction system is greatly simplified to a certain extent, which is not limited herein.

FIG. 4 shows a schematic block diagram of a software structure of a server 200 based on an embodiment. As shown in FIG. 4, a server corresponding to an insurance transaction system is used as an example. The server 200 can include a transaction process processing module 201, a policy data management module 202, a distributed transaction manager 203, and a database 204.

The transaction process processing module 201 is configured to: Respond to an operation request, such as a forward operation request or a rollback operation, initiated by a transaction system running by a terminal device, by invoking a data entity in the database 204 from a transaction system running by the terminal device. The transaction process processing module 201 can send the received operation request to the policy data management module 202 for corresponding processing. In addition, the transaction process processing module 201 can further be responsible for requesting the distributed transaction manager 203 to start the global transaction when determining that next operations that need to be performed need to involve multiple different data sources/or when multiple remote invocations and data updates need to be performed.

The policy data management module 202 is configured to invoke and manage the policy data entity in the database 204, including creating a corresponding historical version table for the policy data entity based on a data table structure of the corresponding policy data entity in the database 204, so as to record version information before and after an operation such as adding, deleting, or changing of the policy data, and can be further configured to record data content that changes due to the previously mentioned data operation. In other embodiments, for non-policy data, the server 200 can also include a non-policy data management module 202, configured to manage non-policy data in the database 204, and the like, which is not limited herein. The historical version table created by the policy data management module 202 can be synchronized to the distributed transaction manager 203 to record the data operation detected by the distributed transaction manager 203. For a specific creation process, refer to related descriptions in step 201. Details are not described herein again.

The policy data management module 202 is further configured to: In response to a data operation request forwarded by the transaction process processing module 201, for example, an operation request for performing a forward operation such as adding, deleting, or changing a requested target data entity, invoke the requested target data entity in the database 204, and perform a corresponding operation on the data entity; and the policy data management module 202 can further record, based on a created historical version table, data entity version information and specific data content that are before and after a corresponding operation. And the policy data management module 202 can also restore, based on the version information recorded in the historical version table in the forward operation process by the target data entity, data content corresponding to the start version to the target data entity and the like.

The distributed transaction manager 203 is configured to process the started global transaction and the registered branch transaction related information, and is used to coordinate the scheduling between the transaction process processing module 201 and the policy data management module 202. For example, the policy data management module 202 submits the branch transaction based on the notification for submitting the global transaction sent by the transaction process processing module 201, and the policy data management module 202 rollback the branch transaction based on the notification for rollback the global transaction sent by the transaction process processing module 201.

The database 204 is configured to store and manage a large quantity of data entities. Each data entity can correspond to a data invoking requirement of a distributed transaction system, and be created in the database 204. For example, for an insurance transaction system, each data entity can correspond to premium and address data in a policy, and create a data table structure as shown in the previously mentioned FIG. 3. It can be understood that a data table structure corresponding to each data entity can be the same or different.

Figure 5:
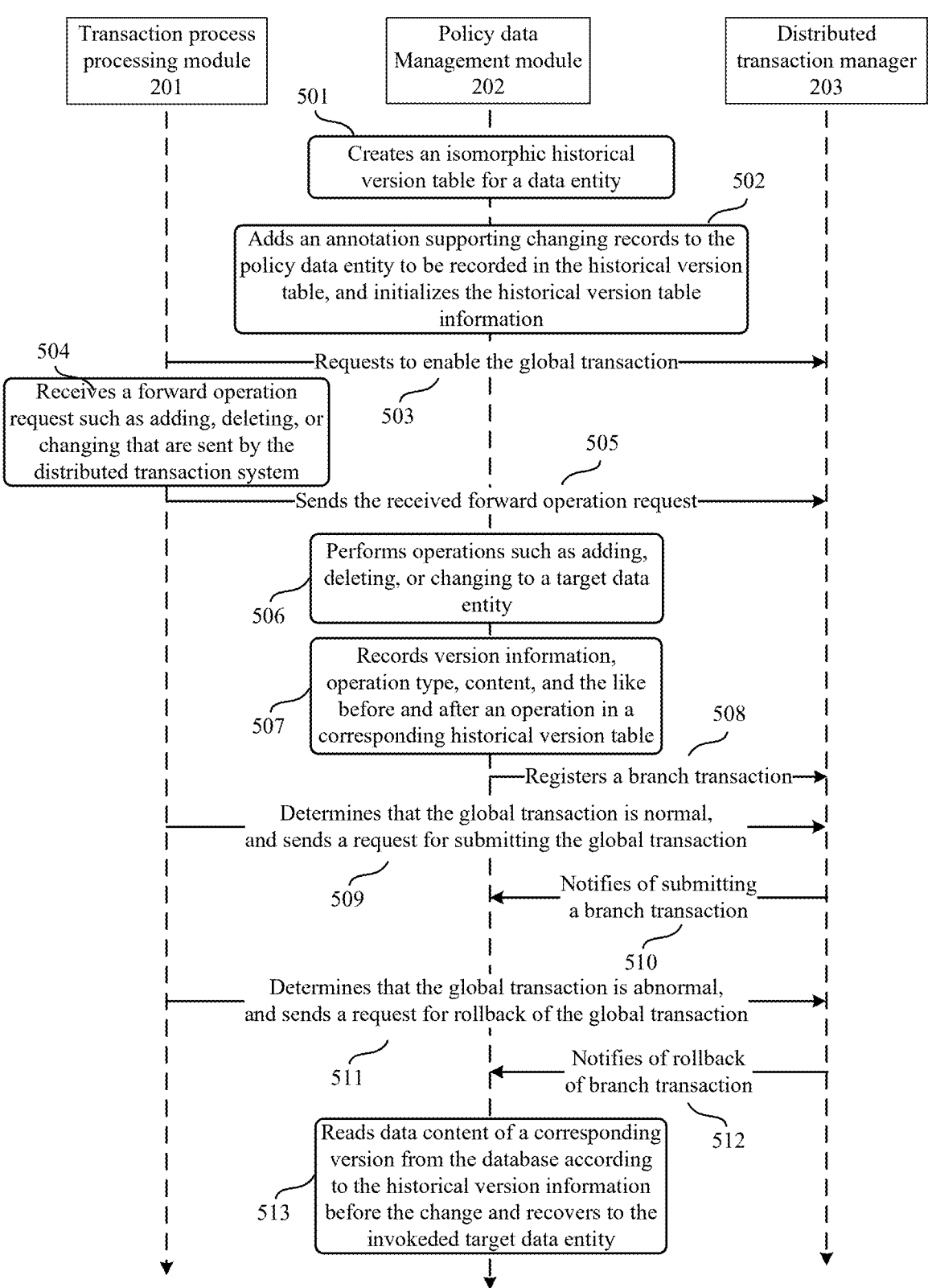
FIG. 5 is a schematic flowchart of interaction between some structures of a server 200 in an embodiment process of a distributed transaction processing method of an embodiment.

FIG. 5 shows a schematic flowchart of interaction between some structures of a server 200 in an embodiment process of a distributed transaction processing method of an embodiment. As shown in FIG. 5, the interaction procedure includes the following steps:

501: The policy data management module 202 creates an isomorphic historical version table for a data entity.

The isomorphism refers to that a created historical version table is the same as or similar to a data table structure of the target data entity. For a specific creation process, refer to related descriptions in step 201. Details are not described herein again.

502. The policy data management module 202 adds an annotation supporting changing records to the policy data entity to be recorded in the historical version table, and initializes the historical version table information.

For a process of adding an annotation supporting changing records and a process of initializing the historical version table to the policy data entity, reference can be made to related descriptions in the previously mentioned step 202, and details are not described herein again.

It can be understood that a process in which the policy data management module 202 creates a historical version table and initializes the historical version table can be synchronously completed, that is, content executed in the previously mentioned steps 501 and 502 can be implemented in one step, which is not limited herein.

503: The transaction process processing module 201 requests the distributed transaction manager 203 to start the global transaction.

For example, the program code executed by the transaction process processing module 201 can determine whether multiple different data sources/multiple remote invocations and data updates are required for next operations that need to be performed. If yes, the distributed transaction manager 203 is requested to start the global transaction.

504: The transaction process processing module 201 receives a forward operation request such as adding, deleting, or changing that are sent by the distributed transaction system.

The forward operation refers to the previously mentioned operations such as adding, deleting, and changing performed on the target data entity of the start version. For details, refer to related descriptions in step 203. Details are not described herein again.

It can be understood that, in some embodiments, the forward operation request such as adding, deleting, and changing that are sent by the distributed transaction system can be a distributed transaction operation request written into a bin log event or a update log event of MySQL. For this reason, the transaction process processing module 201 can parse a received bin log event to acquire bin log data, or parse a received update log event to acquire update log data, and then identify a forward operation request such as adding, deleting, or changing from the parsed update log data.

505: The transaction process processing module 201 sends the received forward operation request to the policy data management module 202.

For example, after the transaction process processing module 201 performs the previously mentioned step 503 to receive the operation request of adding, deleting, or changing a forward operation, the transaction process processing module 201 can invoke an Application Programming Interface (API) interface of the policy data management module 202. For example, the API interface is a network API interface based on the Restful interface, and can send the received forward operation request and complete policy data of the request operation to the policy data management module 202. The policy data management module 202 is responsible for executing the operation request, and performs an update operation on the target data entity in the database.

506: The policy data management module 202 performs operations such as adding, deleting, or changing to a target data entity.

For example, the policy data management module 202 can invoke, in response to the received forward operation request, a database interface to perform an operation such as corresponding adding, deleting, or changing on data content of the target data entity.

When processing requests such as adding, deleting, and changing, the policy data management module 202 can create a mirror image (i.e., a copy) of the target data entity before and after the corresponding operation is updated, and organize it into an undo log, and submit, by using a ACID feature of the local transaction, the update of the transaction data and the write of the undo log in the same local transaction. In this way, it can be ensured that any submitted transaction data update exists in a corresponding undo log. In addition, because a historical version table is created, only a version number needs to be stored in the undo log as index information, and complete change content does not need to be stored. When the policy data management module 202 performs a forward operation or a subsequent rollback operation on the data content of the target data entity, the undo log can read data content of a corresponding version based on version information provided in the historical version table. In this way, data operation processing efficiency of the policy data management module 202 can be improved.

In this way, in subsequent step 509, if the transaction process processing module 201 determines to submit the global transaction, and then the policy data management module 202 notifies, based on the distributed transaction processor 203, to submit the branch transaction, that during the distributed transaction being submitted, synchronous coordination process is not required, and only the rollback log needs to be asynchronously cleaned, so that the submission can be quickly completed.

It can be understood that in other embodiments, Hibernate Interceptor can also be used to intercept all database update operations, for example, to intercept changing or deleting of a target data entity. Hibernate stores data mirror image content before and after a data entity changes in a memory. An interceptor can read data content before and after these changes, and write the data content to a local undo log table, so as to implement a data image in the undo log, which is not limited herein. In this way, an operation of reading a data image before and after a change by using SQL can be avoided, and operation performance can be improved.

507: The policy data management module 202 records version information, operation type, content, and the like before and after an operation in a corresponding historical version table.

For the process of recording version information in the historical version table, refer to related descriptions in step 203. Details are not described herein again.

It can be understood that, in some embodiments, when performing step 503, the transaction process processing module 201 can also send the bin log data or the update log data acquired by means of parsing to the distributed transaction manager 203. However, the distributed transaction manager 203 can update the corresponding version data content and the corresponding version information of the target data entity in the acquired historical version table based on the received bin log data or update log data.

508. The policy data management module 202 registers a branch transaction with the distributed transaction manager 203.

For example, the policy data management module 202 can trigger to register a branch transaction with the distributed transaction manager 203 after performing the previously mentioned step 507 to complete recording of a related field and version information in the historical version table. It can be understood that the policy data management module 202 can temporarily store some invocation information in the distributed transaction manager 203 by registering a branch transaction, so that the distributed transaction manager 203 can perform callback based on the temporarily stored invocation information when the global transaction is submitted or during the rollback of the global transaction.

509: The transaction process processing module 201 determines that the global transaction is normal, and sends a request for submitting the global transaction to the distributed transaction manager 203.

For example, the transaction process processing module 201 can capture an exception reported by each interface or proxy node in a global transaction processing process, for example, a database write failure or a network exception. If there is no exception (normal), the transaction process processing module 201 can invoke a commit interface of the distributed transaction manager 203 to request to submit the global transaction.

510: The distributed transaction manager 203 notifies the policy data management module 202 of submitting a branch transaction.

For example, the distributed transaction manager 203 can submit a branch transaction to the policy data management module 202 in response to a received request for submitting a global transaction, so as to notify the policy data management module 202 to commit. The policy data management module 202 can delete a local undo log record based on a commit notification.

It can be understood that, after the transaction process processing module 201 determines to submit the global transaction, the policy data management module 202 can complete, based on the branch transaction processor 203, submission of the branch transaction, without synchronous coordination processing, and only needs to asynchronously clean up the rollback log, so as to quickly complete the process of submitting the branch transaction.

It can be understood that, in some embodiments, to implement that data content of a target data entity imported and exported into a corresponding database is consistent, the distributed transaction manager 203 can acquire an active transaction list at a current moment. The active transaction list is used to mark a completion degree of a data table import and export operation of each data entity in the current database. It can be understood that an import and export operation is performed on the data table of the target data entity to implement operations such as adding, deleting, and changing a corresponding data table. Further, when exporting the target data entity from the database to perform an operation such as adding, deleting, or changing, the distributed transaction manager 203 can form a data consistency compensation statement based on the active transaction list and the log of the corresponding database, and instruct the corresponding database to execute the statement, so as to ensure that data content of the target data entity imported and exported by the database is consistent in a process of performing an operation such as adding, deleting, or changing to the target data entity. The log of the database can be, for example, log data acquired by the transaction process processing module 201 by parsing the bin log event or the update log event in step 503.

In other embodiments, the distributed transaction manager 203 can also ensure, in another way, that data content of an operating data entity imported and exported from a corresponding database is consistent, which is not limited herein.

511: The transaction process processing module 201 determines that the global transaction is abnormal, and sends a request for rollback of the global transaction to the distributed transaction manager 203.

For example, when receiving the rollback operation request sent by the distributed transaction system, or acquiring abnormal data such as a database write failure or a network exception, the transaction process processing module 201 can confirm that the global transaction is abnormal. In this case, a rollback interface of the distributed transaction manager 203 can be invoked to request to rollback the global transaction.

It can be understood that if the transaction process processing module 201 commits the rollback of the global transaction, rollback can be coordinated by using a distributed transaction manager. For example, the distributed transaction manager 203 can perform the following step 512 to instruct the policy data management module 202 to rollback the branch transaction.

In other embodiments, the transaction process processing module 201 can also receive a rollback operation request sent by a distributed transaction system in response to a user operation, so as to generate a rollback global transaction request to implement fast rollback of transaction data. No limitation is imposed here.

The rollback operation request sent by the distributed transaction system can be, for example, a distributed transaction operation request recorded in the bin log event of tMySQL. For this purpose, the transaction process processing module 201 can parse the received bin log event to acquire bin log data, for example, a rollback operation request. Further, the transaction process processing module 201 can identify the previously mentioned rollback operation request based on the bin log data acquired by means of parsing.

512: The distributed transaction manager 203 notifies the policy data management module 202 of rollback of branch transaction.

For example, in response to a received request to rollback a global transaction, the distributed transaction manager 203 can notify the policy data management module 202 of the rollback branch transaction, so as to instruct the policy data management module 202 to rollback. The policy data management module 202 can perform a data recovery operation based on a rollback notification based on version information recorded in a historical version table.

It can be understood that data recovery operations performed based on version information recorded in the historical version table are more efficient and more rapid and direct.

513: The policy data management module 202 reads data content of a corresponding version from the database based on the historical version information before the change and recovers to the invoked target data entity.

Wherein, the historical version information can be, for example, a start version number.

For a specific process of acquiring the historical version information, reference can be made to related descriptions in the previously mentioned step 204, which is not limited herein.

It can be understood that, after receiving the rollback notification sent by the distributed transaction manager 203, the policy data management module 202 can find a corresponding rollback log record by using the global transaction id (XID) and the branch transaction id (Branch ID), and read data content corresponding to the historical version table based on the historical version information in the rollback log record, so as to generate a reverse update SQL and execute the reverse update SQL, so as to complete rollback of the branch transaction.

Therefore, it can be understood that the distributed transaction processing solution based on the historical version table provided in this application can enable the policy data management module 202 to implement a fast operation based on the historical version and a rollback function. In addition, it is unnecessary to read and store data content before and after a change, and only a historical version ID corresponding to corresponding policy data (that is, a target data entity) can be read or recorded.

After the policy data management module 202 completes data content restoration to the target data entity based on the historical version information, the interface display content of the corresponding distributed transaction system is also updated to the data content of the corresponding historical version. For details, reference can be made to related descriptions in the previously mentioned step 204, which is not limited herein.

FIG. 6 shows a schematic hardware structural diagram of a server 200 based on an embodiment.

As shown in FIG. 6, in some embodiments, the server 200 can include one or more processors 604, a system control logic 608 connected to at least one of the processors 604, a system memory 612 connected to the system control logic 608, a non-volatile memory (NVM) 616 connected to the system control logic 608, and a network interface 620 connected to the system control logic 608.

In some embodiments, the processor 604 can include one or more single-core or multi-core processors. In some embodiments, the processor 604 can include any combination of a general purpose processor and a dedicated processor (e.g., a graphics processor, an application processor, a baseband processor, or the like). In an embodiment in which the server 200 uses the evolved Node B (eNB) 101 or the radio access network (RAN) controller 102, the processor 604 can be configured to execute various compliant embodiments, for example, one or more of the multiple embodiments shown in FIG. 2 to FIG. 5.

In some embodiments, the system control logic 608 can include any suitable interface controller to provide any suitable interface to at least one of the processors 604 and/or any suitable device or component communicating with the system control logic 608.

In some embodiments, the system control logic 608 can include one or more memory controllers to provide an interface connected to the system memory 612. The system memory 612 can be configured to load and store data and/or instructions. In some embodiments, the memory 612 of the server 200 can include any suitable volatile memory, such as a suitable dynamic random access memory (DRAM).

The NVM/memory 616 can include one or more tangible, non-temporary, computer readable media for storing data and/or instructions. In some embodiments, the NVM/memory 616 can include any suitable non-volatile memory such as flash memory and/or any suitable non-volatile storage device such as at least one of an hard disk drive (HDD), a compact disc (CD) drive, a Digital Versatile Disc (DVD) drive. The NVM/memory 616 can include a part of a storage resource on an apparatus for installing the server 200, or can be accessed by a device, but can not be a part of the device. For example, the NVM/storage 616 can be accessed via the network via the network interface 620.

In particular, the system memory 612 and the NVM/memory 616 can respectively include a temporary copy and a permanent copy of the instruction 624. The instruction 624 can include an instruction that causes the server 200 to implement the method shown in FIG. 3 to FIG. 4 when at least one of the processors 604 performs execution. In some embodiments, instructions 624, hardware, firmware, and/or software components thereof can alternatively/alternatively be placed in system control logic 608, network interface 620, and/or processor 604.

The network interface 620 can include a transceiver configured to provide a radio interface for the server 200 to communicate with any other suitable device (e.g., front-end module, antenna, etc.) over one or more networks. In some embodiments, the network interface 620 can be integrated into other components of the server 200. For example, the network interface 620 can be integrated into at least one of the processor 604, a system memory 612, a NVM/memory 616, and a firmware device with instructions. When at least one of the processor 604 executes the instructions, the server 200 implements the methods shown in FIG. 2 to FIG. 5. The network interface 620 can further include any suitable hardware and/or firmware to provide a multi-input multi-output radio interface. For example, the network interface 620 can be a network adapter, a wireless network adapter, a telephone modem, and/or a wireless modem.

In an embodiment, at least one of the processors 604 can be encapsulated with logic of one or more controllers for system control logic 608 to form a SiP. In an embodiment, at least one of the processors 604 can be integrated on the same die as one or more controllers for system control logic 608 to form an on-chip system (SoC).

The server 200 can further include an input/output (I/O) device 632. The I/O device 632 can include a user interface, so that a user can interact with the server 200. The peripheral component interface is designed so that the peripheral component can also interact with the server 200. In some embodiments, the server 200 further includes a sensor configured to determine at least one of environmental conditions and location information related to the server 200.

In some embodiments, the user interface can include, but is not limited to, a display (e.g., a liquid crystal display, a touchscreen display, etc.), a speaker, a microphone, one or more cameras (e.g., still image cameras and/or cameras), flashlights (e.g., LED flashes), and keyboards.

In some embodiments, peripheral component interfaces can include but are not limited to non-volatile memory ports, audio jacks, and power interfaces.

In some embodiments, the sensor can include but is not limited to a gyroscope sensor, an accelerometer, a proximity sensor, an ambient light sensor, and a positioning unit. The positioning unit can also be part of or interact with the network interface 620 to communicate with components of the positioning network (e.g., global positioning system (GPS) satellite).

The reference to "one embodiment" or "embodiment" in the specification means that a specific feature, structure, or feature described with reference to the embodiments is included in at least one example embodiment solution or technology disclosed in the embodiments. The phrase "in one embodiment" in each place in the specification does not necessarily refer to all the same embodiments.

The disclosure of the embodiments further relates to an operation apparatus used to execute the text. The apparatus can be constructed for a specific purpose or can include a general-purpose computer that is selectively activated or reconfigured by a computer program stored in the computer. Such a computer program can be stored in a computer readable medium, such as but is not limited to any type of disk, including a floppy disk, an optical disc, a CD-ROM, a magneto-optical disc, a read-only memory (ROM), a random access memory (RAM), an EPROM, an EEPROM, a magnetic or optical card, an application specific integrated circuit (ASIC), or any type of medium suitable for storing an electronic instruction, and each can be coupled to a computer system bus. In addition, the computer mentioned in the specification can include a single processor or can be an architecture involved in multiple processors that use the added computing capability.

In addition, the language used in this specification has been selected primarily for readable and instructive purposes and can not be selected for the subject matter disclosed in the description or limitation. Therefore, the embodiments are disclosed to illustrate and not limit the scope of the concepts discussed herein.

The invention claimed is:

1. A distributed transaction processing method, wherein the method is performed by a distributed transaction processing system comprising one or more processors and a memory storing instructions that, when executed by the one or more processors, cause the distributed transaction processing system to implement a transaction process processing module, a policy data management module, and a distributed transaction manager, the method comprising:

the policy data management module creating and initializing a historical version table, where the historical version table is used to record, for each field of a target data entity, a data content and a version information of every changed version of each field, wherein the data content includes a changed content of a field in the changed version, and the version information includes a version number of the changed version in which the content of the field is changed, an initialized version information includes a first version information, and the first version information corresponds to first version data content of the target data entity;

the transaction process processing module requesting the distributed transaction manager to start a global transaction;

the transaction process processing module receiving a first-type operation request for the target data entity, and sending the first-type operation request to the policy data management module, where the first-type operation request is used to request to perform the first-type operation on the first version data content of the target data entity, and the first-type operation includes at least one of an adding, deleting, and changing operation;

in response to the first-type operation request, the policy data management module reading a historical version table, recording second version data content obtained by performing the first-type operation on the first version data content, and registering a branch transaction with the distributed transaction manager, where the branch transaction is a related transaction that performs the first-type operation; and the distributed transaction manager notifying, based on a first request for submitting the global transaction sent by the transaction process processing module, the policy data management module to submit the branch transaction.

2. The method of claim 1, wherein the reading the historical version table in response to the first-type operation request, recording second version data content obtained by performing the first-type operation on the first version data content, comprises:

writing the second version data content into the historical version table, and writing the second version information into the historical version table corresponding to the second version data content; and writing the first version information and the second version information into a log used to cancel rollback.

3. The method of claim 2, wherein the method further comprises:

the transaction process processing module acquiring abnormal data in the global transaction or receiving a second-type operation request for the target data entity, and sending a second request for rollback of the global transaction to a distributed transaction manager, where the second request is used to request to rollback the global transaction, so as to update the data content of the target data entity from the second version data content back to the first version data content;

the distributed transaction manager notifying the policy data management module to rollback the branch transaction based on the second request; and based on the notification of rollback of the branch transaction, the policy data management module acquiring the first version data content based on the first version information recorded in the historical version table, and recovering to the current data content of the target data entity.

4. The method of claim 3, wherein the log used to cancel rollback includes a rollback log, and the acquiring the first version data content based on the first version information recorded in the historical version table comprises:

acquiring the first version information recorded in the rollback log;

acquiring the first version data content based on a correspondence between the first version information in the historical version table and the first version data content.

5. The method of claim 4, wherein the historical version table is created by:

creating the historical version table whose structure is the same as a first data table structure based on the first data table structure corresponding to the target data entity.

6. The method of claim 5, wherein a parameter list of the historical version table includes a primary key, a type, a start version, and a to-be-recorded transaction field, and the version information includes a version number recorded in a start version field of the historical version table.

7. The method of claim 6, wherein each parameter in the parameter list of the historical version table is associated with each parameter in the first data table structure, and the association is created by:

the policy data management module adding first annotation information to the first data table structure by using a preset annotation tool, where the first annotation information is parsed by a storage management engine, and is used to update each parameter in the historical version table based on a change of each parameter in the first data table structure.

8. The method of claim 7, wherein the preset annotation tool is an @Audit provided by the Hibernate Envers, and the storage management engine is a Hibernate.

9. The method of claim 5, wherein the first version information is a first version number recorded in a start version field in the historical version table.

10. The method of claim 5, wherein the in response to the first-type operation request, the policy data management module reading a historical version table, comprises:

the policy data management module reading the historical version table based on a preset SQL, where the preset SQL at least includes one of: a name of the historical version table, a primary key, and a version number recorded in a start version field in correspondence.

11. The method of claim 10, wherein the second-type operation request comprises:

a request for cancelling the first-type operation, or
a request for invoking the first version data content to perform the first-type operation again.

12. The method of claim 3, wherein the second-type operation request is a distributed transaction operation request written into a bin log event of the MySQL; and the transaction process processing module receiving a second-type operation request for the target data entity, and sending a second request for rollback of the global transaction to a distributed transaction manager, comprises:

the transaction process processing module parsing the received bin log event to acquire the bin log data;

the transaction process processing module identifying, based on the bin log data, a rollback operation request for requesting to update second version data content back to the first version data content; and the transaction process processing module sending a second request for rollback of the global transaction to the distributed transaction manager based on the identified rollback operation request.

13. The method of claim 1, wherein the first-type operation request is a distributed transaction operation request written into a bin log event or an update log event of MySQL; and the transaction process processing module receiving a first-type operation request for the target data entity, and sending the first-type operation request to the policy data management module, comprises:

the transaction process processing module determining that the first-type operation request is a distributed transaction operation request written into a bin log event or an update log event of MySQL;

the transaction process processing module parsing the received bin log event to acquire bin log data, or parsing the received update log event to acquire update log data;

the transaction process processing module identifying a distributed transaction operation request corresponding to an adding operation, a deleting operation, or a changing operation based on the bin log data or the update log data; and the transaction process processing module forwarding the identified distributed transaction operation request as the first-type operation request to the policy data management module.

14. The method of claim 1, wherein the target data entity is stored in a database for distributed transactions, and the method comprises:

in the process of executing the first-type operation, data content of the target data entity stored in the database is consistent with real-time data content of the target data entity operated by the policy data management module by:

the distributed transaction manager acquiring an active transaction list at a current moment, where the active transaction list is used to mark execution progress of the first-type operation performed by each data entity in the database, and each data entity in the database includes the target data entity; and the distributed transaction manager forming a consistency compensation statement and a compensation instruction based on the active transaction list and the log data corresponding to the target data entity generated by the current database, and sending the consistency compensation statement and the compensation instruction to the database, where the compensation instruction is used to instruct the database to execute the consistency compensation statement, and update the real-time data content corresponding to the execution progress of the first-type operation to the data content of the target data entity in the database.

15. An apparatus, comprising: one or more processors; one or more memories; the one or more memories store one or more programs; when one or more programs are executed by the one or more processors, the apparatus performs the distributed transaction processing method of claim 1.

16. A non-transitory computer readable storage medium, wherein the non-transitory computer readable storage medium stores instruction, and when the instruction is executed on a computer, the computer executes the distributed transaction processing method of claim 1.

\*   \*   \*   \*   \*